N. GENTILE.
APPARATUS FOR RECOVERING OIL FROM SHIPS' WELLS AND FOR SEPARATING IT FROM WATER AND EXTRANEOUS MATTERS.
APPLICATION FILED JAN. 29, 1919.
1,317,971. Patented Oct. 7, 1919.
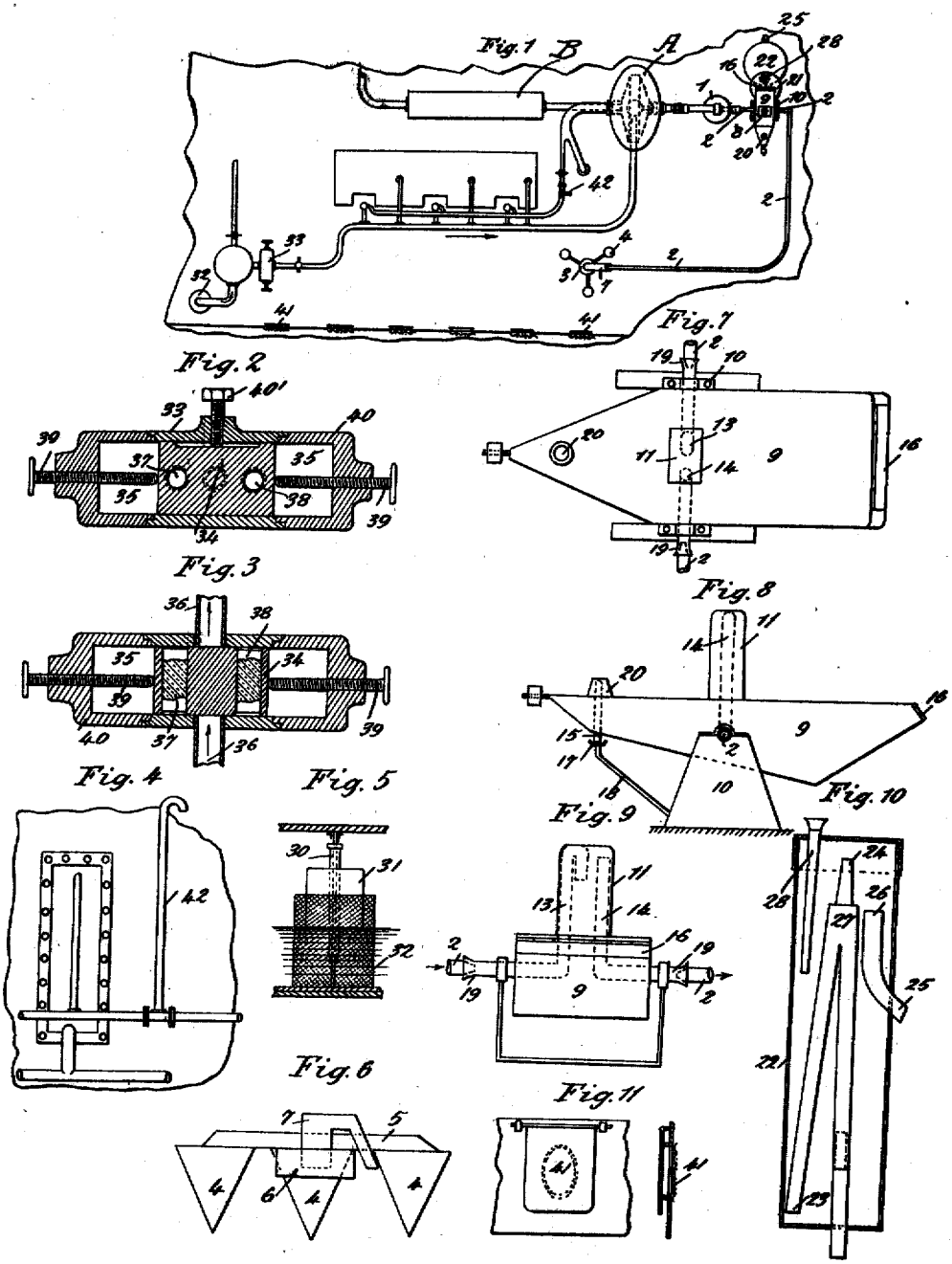

UNITED STATES PATENT OFFICE.

NICOLA GENTILE, OF CIVITAVECCHIA, ITALY.

APPARATUS FOR RECOVERING OIL FROM SHIPS' WELLS AND FOR SEPARATING IT FROM WATER AND EXTRANEOUS MATTERS.

1,317,971.     Specification of Letters Patent.     Patented Oct. 7, 1919.

Application filed January 29, 1919. Serial No. 273,817.

*To all whom it may concern:*

Be it known that I, NICOLA GENTILE, a subject of the King of Italy, and residing at Civitavecchia, Italy, whose post-office address is Via Giordano Bruno 8, Civitavecchia, have invented certain new and useful improvements in or relating to apparatus for recovering oil from ships' wells and for separating it from water and extraneous matters, of which the following is a specification.

This invention relates to improvements in means for recovering oil which is generally exhausted into the sea and lost, from the ships' wells into which the water used for the cooling of the several moving members of the power plant of a ship is run.

According to the invention an apparatus is provided for automatically drawing up the upper layers of water collected into the ship's well and then raising them to separating and recuperating devices.

Further fresh water can be used for cooling the various members of the power plant thus facilitating the recovery of the oil, and lubricating media with more efficient results, on account of the mixing of the oil with the water employed for cooling the several moving parts.

This is attained by shutting off all communication of the ship's well with the sea and by using continually the same water which thus performs a closed cycle.

A further object of the invention is to economize the quantity of lubricant, so that in many cases only 50% of the total quantity of the lubricant is used. Moreover the several parts of the machine, being cooled with fresh water, the incrustations due to the salt water, are greatly reduced.

In carrying out the invention the advantages obtained are many, the most important of which are that, as the communication of the wells with the sea is prevented, the danger of flooding of the engine room is greatly reduced, and as the same pumps employed to exhaust the wells are utilized to operate the system the necessity to install new machinery is avoided which is very important in the case of small ships.

Filtering and separating devices are also provided to keep the water and the oil at the center of the ship as it will be hereinafter described.

For a better understanding of the invention, reference will now be made to the accompanying drawings in which one form of application of the invention itself is diagrammatically illustrated.

In the drawings:

Figure 1 is a diagrammatic plan view showing the arrangement of the several parts constituting the invention, on board of a ship.

Figs. 2 and 3 are two sections at 90° of the filtering apparatus.

Fig. 4 is the indicator to control the discharge and the circulation of the cooling water.

Fig. 5 shows the float of the suction pipe for the lifting of the water.

Fig. 6 shows the floating device for the collecting and suction of the upper layers of the water.

Figs. 7, 8 and 9 are respectively a plan, an elevation and a cross section of the device which prevents the mixture reaching the suction pump.

Fig. 10 shows the automatic recuperating and separating apparatus, and

Fig. 11 shows one of the valves which keep the mixture at the center of the ship.

Referring to Fig. 1 the shaft of the turbine A operates the centrifugal pump of the condensing plant B and is coupled with a small pump 1, which is normally used in combination with the distilling apparatus for the salt water.

In case the ship is not provided with such pump the aspiration necessary to the working of the apparatus may be obtained with any suitably arranged pump. To the pump 1 is coupled the suction pipe 2 which ends in a float 3 arranged in the well where the mixture of water and oil collects.

The float (Fig. 6) comprises three watertight hollow cones 4, arranged at 120° joined together by means of a star shaped structure 5. In the center of the structure is mounted a cylindrical vessel 6, which, when in normal position, occupies with its open edge a position just below the surface of the mixture of oil and water which forms the upper layers of the water collected within the well.

Within the vessel 6 is placed a curved pipe 7 joined by means of a flexible connection to the suction pipe 2 of the system.

The pipe 2, well ahead of the pump 1, passes through a discharging device 8

(Figs. 7, 8 and 9) which prevents the mixture reaching the pump.

The operation of such device is automatic and the device itself comprises a closed tank 9, mounted pivotally on two side bearings 10. Said tank, when empty, occupies a horizontal position. In the center of the tank 9 is mounted a closed vertical reservoir 11 in which are arranged two vertical tubes 13 and 14 (Fig. 9) which are part of the aspiration tube 2. The tank 9 is further provided with two valves 15 and 16; the valve 15 is closed when the tank being empty lies in the horizontal position, the closing taking place when the tube of the valve 15 comes into contact with a rubber washer 17 arranged to the upper part of the bracket 18.

The said valve is formed by a tube 15 which traverses completely the tank 9 and is in communication with the same by means of the cap 20. The other valve 16, is an ordinary hinged valve which opens only when the tank, being filled, rotates on its supports 10.

The pipe 2 is rotatably connected to the pipes 13 and 14 by means of the unions 19.

When the pump begins to operate, it draws air from the tank 6, and under the atmospheric pressure the upper layers (oil and water) of the water collected into the well, pass from the vessel 6 of the float 3, and through the pipe 2 and the pipe 13 to fill the tank 9. This tank, owing to its peculiar shape will as it fills up, have its center of gravity displaced toward its larger end, until being completely filled, the tank rotates allowing the fluid to flow out through the valve 16 and so fall into the funnel 21 of the recuperator 22. During the emptying of the tank the valve 15 opens, establishing communication between the inside of the tank and the outside atmosphere resulting in an interruption of the suction of the liquid from the well.

As soon as the tank 9 is emptied it rotates to return to its original horizontal position, the valves 15 and 16 close, and the pump draws again oil and water from the well.

In this manner the mixture can never reach the chamber of the pump, which works as an air pump, thus avoiding a too intimate emulsion of the oil with the water, which would render very difficult any separation of the oil.

The mixture of oil and water discharged from the tank 9 falls into the separator 22 (Fig. 10). The recuperator comprises a cylindrical reservoir within which is arranged a siphon shaped tube 23 open at its upper end which is provided with a tubular extension 24. An overflow tube 25 is arranged within the reservoir 22, the edge 26 of the tube 25 being placed slightly above the overflow level 27 of the siphon. The operation of the recuperator is automatic and very simple. As the mixture fills the reservoir and the level of the mixture rises within it and within the tube 28, the mixture separates, that is to say, the water remains at the bottom and the oil rises at the surface. But as the lower extremity of the siphon reaches nearly the bottom of the reservoir, it is evident that only the water will rise within the tube 28, until, reaching the overflow level 27, the water will be discharged through the descending tube of the siphon returning to the well.

As the filling continues the thickness of the layer of the floating oil will increase until it reaches two-thirds of the total volume of water and oil. At this point separation of the oil takes place on account of the specific weight between the water and the oil.

To equilibrate the weight of the water within the portion of the tube 23 comprised between the bottom of the reservoir and the overflow level 27 it is necessary that the level of the liquid (which comprises two-thirds of oil and one of water) shall be higher to allow that such level shall reach the opening 26 of the discharge tube 25. It is evident that from this latter will flow out only the oil, which may be filtered and collected into suitable tanks.

The water that collects in the well is thus continuously separated from the oil with which it mixes during the cooling of the several parts of the machinery, the water being sent through the piping of the system by means of a small pump. To prevent that the cooling water shall carry oil with it, which would occur if the water was drawn from the surface, the suction pipe 30 of the pump is provided with a sliding float 31 (Fig. 5) which owing to its predetermined weight dips a certain distance into the oily layer and rising and lowering with it keeps away the oil from the suction tube 30. A wire screen 32 prevents any foreign matter blocking the pipe.

Furthermore to prevent any foreign matter passing into the water nozzles (where the cooling is done by spray) on a suitable point of the induction pipe is coupled the filtering device 33 (Figs. 2 and 3). This filter is double, and it is constituted by a central body 34 sliding in a bore in the cylinder 35.

To this cylinder are connected pipes 36 which belong to the water piping system. Within the block 36 are provided two openings 37 and 38. These openings contain the filters. By changing the position of the central block, one or the other of the openings 37 and 38 are brought to coincide with the pipes 36. The displacement of the block is obtained by means of the operation of the screws 39, and its stroke is limited by means of the screw 40' engaging a groove formed into the block 34.

Fig. 11 shows a gate or hinged valve controlling the flow of water within the ship's well. The purpose of this valve is to keep the water in the central parts of the ship. Said valves are applied to the intercommunication passages of the wells, on both sides of the center line of the ship, and all open toward the center of the ship and more particularly where the suction pipes of the system described are placed. The various movements of the ship allow for the opening of such valves toward the center, permitting the passage of the water but preventing it flowing back from the well.

The valves may be provided with screens.

These arrangements present the advantage of keeping always a sufficient quantity of the oil and water in the central well of the ship, and also provide a greater stability of the ship itself.

Fig. 4 shows the tube which serves to indicate when the circulation of the cooling water takes place through the entire system, 43 indicating the guides of the engine.

In Fig. 1, C indicates the engine.

Having now particularly described and ascertained the nature of my said invention and in what manner the same is to be performed, I declare that what I claim is:

1. In a system for separating oil from the water used for cooling the several moving parts of the propulsion plant of a ship, the combination of a pump, a discharger, a separator, a floating device, and connections to cause the mixture of oil and water to be drawn through the floating device and sent to the discharger and from the latter to the separator, before reaching the pump.

2. In a system for separating oil from the water used for cooling the several moving parts of the propulsion plant of a ship, the combination of a pump, an automatic discharger to collect the oily mixture drawn by the pump, and comprising a balanced container having valves to cause the same to alternately fill and discharge, a separator, a floating device, and connections to cause the mixture of oil and water to be drawn through the floating device and sent to the discharger and from the latter to the separator, before reaching the pump.

3. In a system for separating oil from the water used for cooling the several moving parts of the propulsion plant of a ship, the combination of a pump, a discharger, a separator, a floating device, and connections to cause the mixture of oil and water to be drawn through the floating device and sent to the discharger and from the latter to the separator, before reaching the pump, said separator comprising a reservoir and an inverted V-shaped tube therein open at its upper end, and through which the water is discharged, said separator having an oil overflow discharge arranged at a point above the bottom thereof.

In testimony whereof I have hereunto signed my name in the presence of two witnesses.

NICOLA GENTILE.

Witnesses:
O. PIZZOCOLO,
GALLI ETTORE.

Copies of this patent may be obtained for five cents each, by addressing the "Commissioner of Patents, Washington, D. C."